United States Patent

[11] 3,558,920

[72] Inventor Ivar Giaever
Schenectady, N.Y.
[21] Appl. No. 723,447
[22] Filed Apr. 23, 1968
[45] Patented Jan. 26, 1971
[73] Assignee General Electric Company
a corporation of New York

[54] BISTABLE PHOTOSENSITIVE DEVICE UTILIZING TUNNEL CURRENTS IN LOW RESISTIVE STATE
3 Claims, 8 Drawing Figs.

[52] U.S. Cl. .......... 307/245,
307/311, 307/322; 250/211; 317/234
[51] Int. Cl. .......... H03k 17/70,
H03k 3/38
[50] Field of Search .......... 250/211;
307/311, 245

[56] References Cited
UNITED STATES PATENTS

| | | | |
|---|---|---|---|
| 2,641,711 | 6/1953 | Tommasi | 307/311 |
| 2,912,592 | 11/1959 | Mayer | 250/211 |
| 3,259,759 | 7/1966 | Giaever | 307/245 |
| 3,278,808 | 11/1966 | Bonfeld | 307/245 |
| 3,329,823 | 7/1967 | Handy | 307/311 |
| 3,344,280 | 9/1967 | Martel | 250/211 |
| 3,379,527 | 4/1968 | Corrsin et al. | 250/211 |
| 3,461,296 | 8/1969 | Ovshinsky | 250/211 |

*Primary Examiner*—Donald D. Forrer
*Assistant Examiner*—Harold A. Dixson
*Attorneys*—Paul A. Frank, John F. Ahern, Vance A. Smith, Frank L. Neuhauser, Oscar B. Waddell and Melvin M. Goldenberg

ABSTRACT: A photoconductive switch is constructed in sandwichlike form with two conductors as the outer layers and photosensitive semiconductor material as the thin inner layer. At operating temperatures, the semiconductor material having a state of high resistivity in darkness is excited by incident radiation to a state of less resistivity. During this latter state the magnitude of the electron tunneling current moving from one conductor to another across the semiconductor material is greatly increased. Means for keeping the semiconductor material in the state of less resistivity is possible as is means for readily changing the layer between the two states. In one embodiment of the switch the conductors are cooled to a superconducting state in which the unusual current-voltage characteristics of the superconductor junctions are utilized.

Inventor:
Ivar Giaever,
by Paul A. Frank
His Attorney.

Inventor:
Ivar Giaever,
by Paul A. Frank
His Attorney.

BISTABLE PHOTOSENSITIVE DEVICE UTILIZING TUNNEL CURRENTS IN LOW RESISTIVE STATE

The present invention relates to new switching devices which include, as an integral portion thereof, a thin photosensitive layer between two conducting members. More particularly, the invention relates to bistable photoelectric switches cooled to operating temperatures which, when exposed to light, are capable of increased conduction of a current largely composed of electrons "tunneling" from one of the conducting members through the photosensitive layer to the other conducting member.

The need for small but economical switches in sophisticated electronic circuitry is becoming increasingly evident, particularly in the memory core circuits of electronic computers. The implementation in circuitry of a bistable laminar switch with high and low resistive stages which could, for example, represent the "zero" and "one" positions of a binary base would be a beneficial addition in the field of electronics.

The concept of using quantum mechanical tunneling currents has also been met with increasing favor in the field of electronics. It is now well known that tunneling can also occur between two conductors if the spacing between them is sufficiently small. An example of this can be found in my U.S. Pat. No. 3,116,427, entitled "Electron Tunnel Emission Device Utilizing an Insulator Between Two Conductors Either or Both of Which May be Superconductive," issued Dec. 31, 1963. That such tunneling occurs in lieu of normal electrical conduction is shown by the fact that the current-voltage characteristic of a tunnel junction is not ohmic, is independent of temperature, and that the current itself depends exponentially upon the separation distance between the conductors. Heretofore, no laminar switch has been available which is not only economically feasible but also has bistable resistivity characteristics and is capable of increased conduction of tunneling currents in its low resistivity state.

In accord with one embodiment of my invention, I solve the foregoing problem by providing, through a novel method, an inexpensive laminar bistable electronic switch including conductor members separated by a layer of photosensitive semiconductor material. When light of an appropriate wavelength is directed against the layer of photosensitive semiconductor material, the electrical resistance of the material is lowered. Being constructed to the proper dimensions and cooled to operating temperatures, the layer allows an increased number of electrons to tunnel from one conductor to another. I have found that the optimum results occur when the material is cooled to the temperature of liquid nitrogen or less.

The wavelength of the light necessary to lower the resistance of photosensitive material depends primarily upon the composition of material used. Thus, the light used may extend from the region of infrared light to the region of ultraviolet light. It is within this definition that the word "light" is used throughout the present application.

In accord with another feature of my present invention, I operate my cell at low temperatures which, among other things, prevents the occurrence of "conductance decay." It is a characteristic of photosensitive semiconductor materials and therefore photoconductive cells, to return to the state of high resistivity after having once been exposed to light. When a switch is to be left indefinitely in the low resistive state, conductance decay is undesirable. Thus, by cooling a bistable switch to low temperature levels, I find that I am able to delay or altogether prevent conductance decay. At low temperatures, I am also able to operate my switch with one or both of the conductors in a superconducting state. In my U.S. Pat. No. 3,116,427, I describe functions and results obtainable from the use of a tunnel device with an insulator separating the superconductors. My present invention adds the flexibility of a high and low resistance state to this device by providing a layer of photosensitive semiconductor material in place of the insulator.

It is, therefore, an object of the present invention to provide new electronic switch devices readily adaptable to, but not exclusively for, use in computer memory elements and the like.

It is another object of my invention to provide electronic switch devices which conduct current primarily composed of tunneling electrons.

Yet another object of my invention is to provide a means for preventing the return of photoconductive switches to a highly resistive state due to conductance decay.

Still another object of my invention is to provide means for quickly changing electronic switches back and forth between high and low resistive state.

A further object is to provide electronic switches which offer zero resistance to tunnel currents in the low resistive state.

It is yet another object of my invention to provide a process for preparing new electronic switches in laminar form, The novel features believed characteristic of the present invention are set forth in the appended claims. The invention itself, together with further objects and advantages thereof may best be understood by reference to the accompanying drawings in which:

Figure 1:
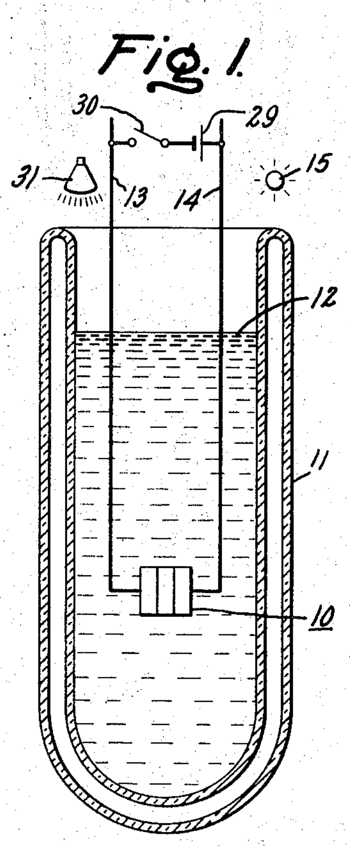
FIG. 1 is a model perspective view of a photoconductive switch device in an operative relation to an electric circuit constructed in accordance with one embodiment of the present invention.

My invention uses, as a thin insulating layer between two conductors, photosensitive semiconductor material. Essentially, the device of the invention is a photoconductive cell operating at low temperatures exhibiting a resistive state under dark room conditions. When excited into its more conductive or less resistive state, the magnitude of the tunneling current crossing the layer increases appreciably in size. There is a small normal electric current also present. The magnitude of the tunneling current, however, in either state is as large or larger than the normal electric current.

There are a number of materials which, when exposed to light, become less resistive to the passing of current. Included among these materials are a number of photosensitive semiconductor materials such as cadmium sulfide (CdS), cadmium selenide (CdSe), and cadmium telluride (CdTe).

In the interest of brevity and by way of example, cadmium sulfide is used as a photosensitive semiconductor material between the conductors in the following descriptive matter. It is understood, however, that any material showing the needed characteristics as detailed herein qualifies as completely adequate. It is within this scope that CdS is employed as a photosensitive material. The disclosed invention is not intended to be limited to any single photosensitive material.

Photosensitive semiconductor materials have very high resistances in dark room conditions and are said to be in electronic equilibrium. Cadmium sulfide in crystalline form, for example, may have a dark room resistance of $10^7$ ohms-cm.

However, upon exposure to light it experiences a resistance drop reaching several orders of magnitude and becomes less resistive to passing of current. Photoconductive cells using semiconductors of this nature find great utility in control applications, measurements, and detection.

According to more recent theory the effect above presupposes the existence of hole traps in light-sensitive semiconductor material. Briefly, when the incident radiation falls on the material, electron-hole pairs are produced, due to photoexcitation. The holes are captures by the hole traps, but since there is little tendency to capture the electrons, the electrons tend to remain in the conduction band for long periods of time. Semiconducting materials, such as cadmium sulfide, are noted for their large "quantum yield." Quantum yield is determined by the number of electrons passing through the material compared to the number of photons absorbed by the incident radiation. Thus, a large quantum yield results in a decrease in resistance, or conversely, in an increase in conductivity.

I have also found it useful to operate devices of my invention at low enough temperatures to take advantage of another characteristic of photosensitive semiconductor materials called the "conductance decay factor."

The conductance decay factor may be defined simply as the duration of time it takes the material to return to its dark state resistance after the incident radiation is removed. At sufficiently low temperatures single crystals have been known to have a decay factor on the order of days. For example, the electronic equilibrium of CdTe starts to lag its thermal equilibrium at 110°K. The lag increases as the temperature is lowered. At temperatures lower than 85°K., the conductance decay factor is almost nonexistent.

I find that similar results occur when devices of my invention using the photosensitive semiconductor materials are operated at low temperatures. For example, if cadmium sulfide is cooled to the temperature of liquid nitrogen, 77°K., the return to electronic equilibrium is on the order of days. This has its distinct advantages when a switch is desired to be left in the tunnel conductive state for an indefinite length of time.

To bring the switch back to its dark room or original state of resistance, however, it is not necessary to wait until complete conductance decay has taken place. I have found that there are a number of methods of quickly returning the material back to its original dark room resistance. I can either heat the photosensitive layer or apply a sufficiently high voltage (usually on the order of 1 volt) across it. Perhaps the simplest method is to direct light of certain wavelengths on the film which, as explained herein, reduces its conductivity.

The last of the above methods relies upon a phenomenon called the "quench effect," which appears when light falls on a light-sensitive crystal in the low resistivity state. Using a layer of CdS as an example, I have found that light having an energy of at least 2.4 electron volts is necessary to photoexcite the layer into a state of low resistivity. To "quench" or bring back the dark resistance requires light of a longer wavelength and, therefore, of lesser energy. Light having an energy of 1 electron volt has been found to be a satisfactory quenching light. The quenching effect arises due to the excitation of the holes in traps to higher energy levels, thereby allowing them to recombine with the electrons, consequently reducing the quantum yield.

It is also another feature of my invention to operate the devices thereof at temperatures low enough to place one or both of the conductors in a superconducting state. As soon as one of the conductors becomes superconducting, the current-voltage characteristic becomes nonlinear. When both of the conductors reach a superconducting state, a current-voltage characteristic begins to show a negative resistance characteristic. Further, Josephson tunneling or "supertunneling" occurs when the two conductors are made superconductive and the layer of photosensitive semiconductor material is made very thin. This super tunneling is characterized by the absence of any potential difference across the tunnel junction. Therefore, the layer, under these conditions, acts as if it were also superconducting; thus making the two conductors and layer into one continuous superconductor. I have found that when the layer is composed of CdS and has a thickness approaching 50 A., the tunneling supercurrent is on the order of 10 milliamperes for a square junction 1 mm. on a side. The unique advantage of using photosensitive semiconductor material for a thin layer in a photocell under these conditions is readily appreciated since it is now possible to go from a large resistance to zero resistance by merely applying light of the proper actuating wavelength.

In FIG. 1, illustrating one embodiment of this invention, the novel photoconductive cell 10 is operated at low temperatures. Photoconductive cell 10 is immersed in a thermal fluid, for example, liquid nitrogen 12 inside the Dewar flask 11.

Wires 13 and 14 connect photoconductive cell 10 to circuit components outside Dewar flask 11 to an appropriate power source and suitable output or readout means (not shown). Light source 15, situated in appropriate position, directs light of the required energy on layer 17 of photosensitive semiconductor material (best seen in FIG. 2) to raise the film to an active state or conductive state.

Figure 2:
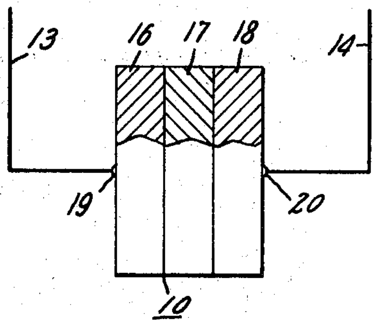
FIG. 2 is an enlarged view, partly in section, of the switch device of FIG. 1.

Photoconductive cell 10 is illustrated more fully by FIG. 2 and shows conductor 16 separated from conductor 18 by layer 17, which is a material having high and low resistivity states. That is, upon exposure to light source 15, layer 17 experiences an increase in the number of electrons tunneling across from one conductor to another. This requires layer 17 to be of sufficient thickness which would be, by the way of example, less than 500 A. for CdS. Though both normal conduction current and tunnel current are functions of the thickness of the material between conductors, it is observed that the magnitude of the tunnel current increases much more rapidly than conduction current as the material thickness decreases. It follows that the thickness of the material necessary to provide the desired tunneling-normal conduction ratio depends, not only on the barrier thickness, but also on the physical characteristics of the type of material used.

Wires 13 and 14 are connected to conductors 16 and 18 by suitable junctions 19 and 20, respectively.

Although conductors 16 and 18 are shown to be approximately as thick as film 17, it should also be understood that the drawing is not representative of relative dimensions and that in practice the conductor elements are of greater thickness. It is necessary for the light of the activating and quenching wavelengths to penetrate one of the conductors to reach layer 17. Thus, one of the conductors must be sufficiently thin to allow transmission. I have found, for example, that a lead layer of 1,000 A. allows penetration. The fact of paramount importance is the ability of photoconductive cell 10 to allow tunnel current to pass through layer 17 after exposure to light source 15.

Figure 3:
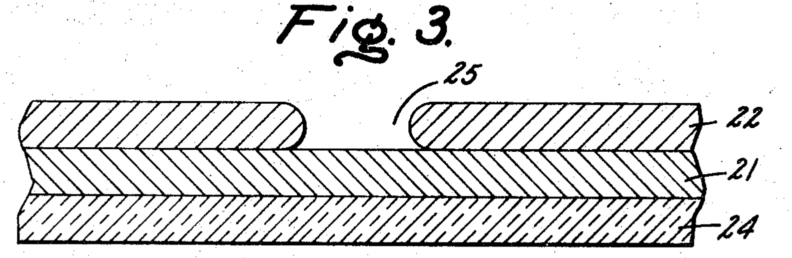
FIG. 3 is a view of a cross section of a partially built switch, showing an aperture in the layer of photosensitive semiconductor material after evaporation onto the conduction layer.
Figure 4:
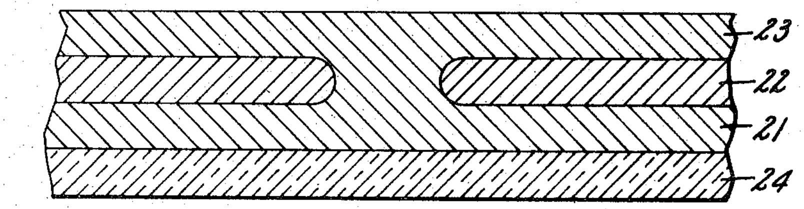
FIG. 4 is a view of a cross section of an incorrectly constructed switch completed without exposing the partially built switch of FIG. 3 to air.
Figure 5:
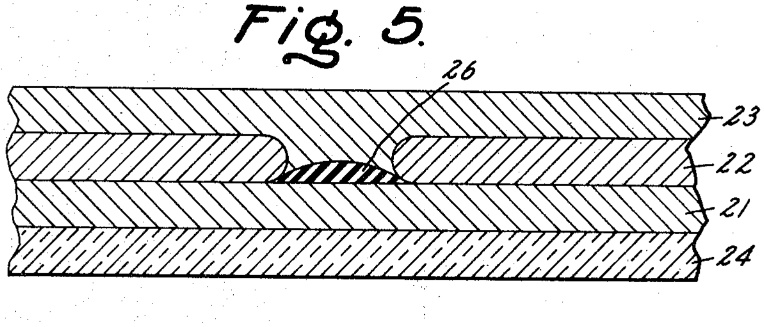
FIG. 5 is a view of a cross section of a completed switch.

Construction of photoconductive cell 10 is best seen through the illustrations provided by FIGS. 3, 4, and 5. I have found that optimum results are obtained if photoconductive cell 10 is constructed in the following manner. First, I vacuum-evaporate a strip of metal 21, for example, aluminum, onto a glass slide 24. Immediately and without breaking the vacuum, a thin layer of light photosensitive semiconductor material 22 is evaporated on top of metal strip 21. Ideally, no holes should appear in material 22, but practically it always contains holes, as illustrated by aperture 25. When a second strip of metal 23 is evaporated over material 22, the aperture 25 is completely filled with metal as seen in FIG. 4. In the absence of an insulator, contact between strips of metal 21 and 23 would result in a short circuit when connected to a power source. However, I have found that when I expose layer 21 on slide 24 to an oxidizing atmosphere, such as air, after evaporation of material 22, the portion of the metal exposed to the air oxidizes, as shown in FIG. 5, by metallic oxide deposit 26 in aperture 25. Now metal strip 23 may be applied and no short circuit results when operating photoconductive cell 10. Current passing between metal strips 21 and 23 passes through film 22 because of the higher insulating properties of metallic oxide deposit 26.

Figure 6:
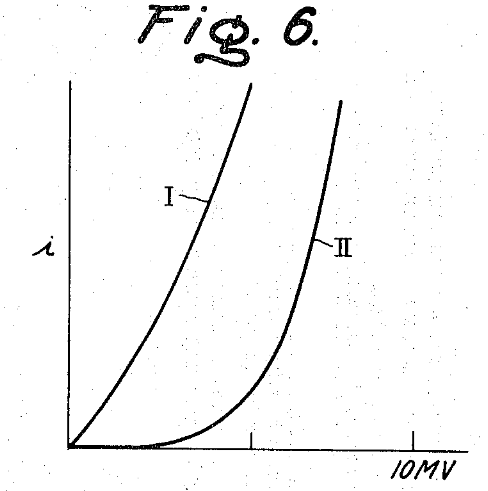
FIG. 6 is a chart bearing curves illustrating electrical characteristics of the device of FIG. 1 when operated at temperatures approximately that of liquid nitrogen and liquid helium, respectively.

FIG. 6 is illustrative of the current-voltage characteristic of normal tunneling characteristics of a CdS layer at liquid nitrogen and helium temperatures. At liquid nitrogen temperature, i.e., 77° K. I have found that a sample of CdS several hundred angstrom units thick with an area of 1 mm.$^2$ has a typical dark resistance of 10,000 ohms. After exposure to light of an actuating wavelength, the resistance drops to about 100 ohms. The current-voltage characteristic is nearly linear for voltages less than about 10 millivolts. This is seen from Curve I.

Figure 7:
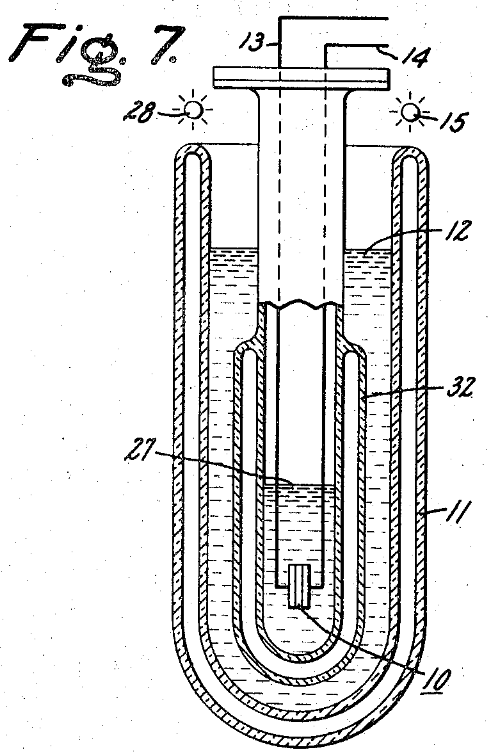
FIG. 7 is a perspective view of the photoconductive switch constructed in accordance with another embodiment of the the present invention.

FIG. 7 is illustrative of another embodiment of devices of my invention operated at liquid helium temperature, i.e., 4.2° K. Photoconductive cell 10 is now located inside inner Dewar flask 32 and immersed below the surface of a body 27 of liquid helium. The lower part of Dewar flask 32 is positioned below the surface of the body 12 of liquid nitrogen. Wires 13 and 14 connect photoconductive cell 10 to a suitable power source and suitable outside circuitry (not shown). Light source 15 is the activating light source, while light source 28 is the quenching light source. Both light sources 15 and 28 are so positioned with respect to photoconductive cell 10 that they can readily direct the desired wavelengths on layer 17.

Of course, it may at times be more practical to restore the dark resistance of layer 17 by heating it or applying a high voltage thereto. This can be easily accomplished by either connecting a sufficient power source 29 (shown in FIG. 1) through switch 30 to wires 13 and 14 or by heating layer 17 with heat source 31.

The resistance of both states goes several order of magnitude higher when the layer is cooled from the temperature of liquid nitrogen to the temperature of liquid helium. When the layer of CdS is approximately 300 A., for example, the current still tunnels through the layer, but now is an approximate exponential function of the voltage and may increase by two orders of magnitude in a voltage range of 10 mv., as can be seen from Curve II of FIG. 6.

In this temperature region, I can operate my photoconductive cell with none, one or both of the conductors in 1 superconductive state. In order to make only one of the conductors superconducting it is necessary that the conductors be made from materials with different critical transition temperatures. Lead, for example, has a transition temperature of 7.2° K. as opposed to a transition temperature of 1.2° K. for aluminum. Thus, at temperatures between 7.2° K. and 1.2° K. a lead conductor is superconducting, while an aluminum conductor remains normal. When one of the conductors reaches its transition temperature, a characteristic change takes place in the current-voltage characteristic as described in my aforementioned U.S. Pat. No. 3,116,427. When both conductors reach their transition temperature and the sensitive layer 17 is made thin enough, then layer 17, in its light exposed state, offers zero resistance to tunneling currents.

Figure 8:
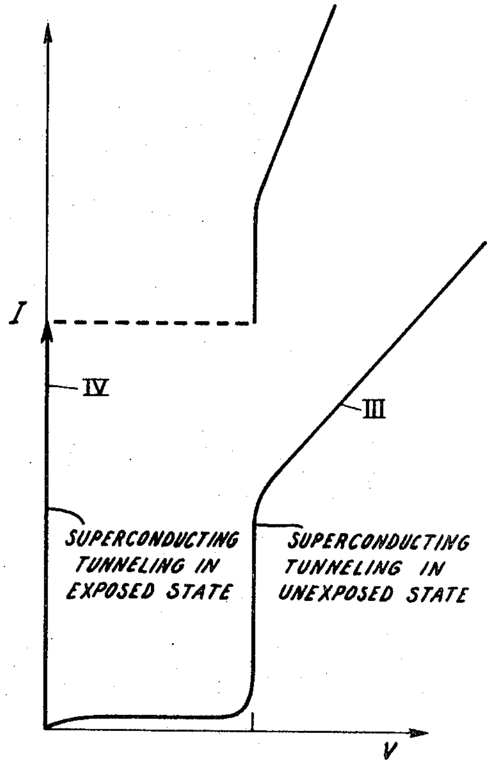
FIG. 8 is a chart bearing curves (not to scale) illustrating a comparison of the current-voltage characteristics of the photoconductive switch in unexposed and exposed states when both conductors are superconducting.

In FIG. 8, the photoconductive cell is being operated at liquid helium temperature with both conductors in a superconducting state. When layer 17 is made thin enough, the current-voltage characteristic shifts from the representative Curve III to Curve IV upon exposure of photoconductive cell 10 to light of a photoexciting wavelength. As previously stated, for exemplary purposes, a thickness of a CdS layer of 50 A. is sufficient to allow such a change. The lower portion of Curve IV represents a supertunneling current and moves directly up the ordinate axis. The direction represents zero potential drop across layer 17. As the supertunneling current increases beyond a certain level, a potential drop results as seen by the abrupt movement of Curve IV outward from the axis. The discontinuity in Curve IV is represented by the dashed lines. At a fixed voltage, the tunnel current across layer 17 in the exposed state, however, remains much greater than the tunnel current in the unexposed state. Thus, the drawing of Curves III and IV are not to scale since in practice, the current difference approaches a magnitude of $1 \times 10^2$ or more.

In the foregoing I have set forth in detail certain specific characteristics of my invention which I believe are descriptive of a new photoconductive switch and method for making the same. I have shown that it is possible to change the resistance of a switch from a state of high resistance to a state of low resistance or even a zero resistance in which the switch conducts a tunneling current of increased magnitude and that it is readily adaptable for use in sophisticated electronic circuitry, such as that required by electric computers.

While I have disclosed the specific embodiments of my invention and have set forth certain examples thereof, many modifications and changes will readily become apparent to those skilled in the art. Accordingly, by the appended claims, I intend to cover all such modifications and changes as fall within the true spirit and scope of the foregoing disclosure.

I claim:

1. A bistable photoconductive switch comprising:

a first conductor;

a layer of photosensitive semiconductor material overlying said first conductor and having a thickness of between 50 and 500 A., said semiconductor material selected from the group consisting of cadmium sulfide, cadmium selenide and cadmium telluride, said layer of photosensitive semiconductor material having at least one aperture therein extending to the surface said first conductor;

an electrically insulating oxide deposit in said aperture;

a second conductor overlying said semiconductor material and said insulating oxide deposit;

means for cooling said first and second conductors and said photosensitive semiconductor material to a temperature wherein at least one of said conductors is in a superconductive state;

said semiconductor material having in the absence of an actuating light a highly resistive first stable state and upon exposure to light a less resistive second stable state and being more permeable to electron tunneling currents in said second stable state; and means for changing said semiconductor material from said second stable state to said first stable state.

2. The switch of claim 1 wherein said first and second conductors are aluminum and said insulating oxide deposit is an oxide of aluminum.

3. The switch of claim 2 wherein said means for cooling causes both of said conductors to become superconductive.